(12) United States Patent
Tao (10) Patent No.: US 11,218,074 B2
(45) Date of Patent: Jan. 4, 2022

(54) ERROR AMPLIFIER WITH ACCURATE OUTPUT CLAMP FUNCTION

(71) Applicant: DONGGUAN CHANGGONG MICROELECTRONICS LTD, Dongguan (CN)

(72) Inventor: Wangke Tao, Dongguan (CN)

(73) Assignee: DONGGUAN CHANGGONG MICROELECTRONICS LTD

( * ) Notice: Subject to any disclaimer, the term of this patent is extended or adjusted under 35 U.S.C. 154(b) by 16 days.

(21) Appl. No.: 16/865,398

(22) Filed: May 3, 2020

(65) Prior Publication Data
US 2021/0344271 A1    Nov. 4, 2021

(51) Int. Cl.
*H02M 3/155* (2006.01)
*H02M 1/08* (2006.01)

(52) U.S. Cl.
CPC ............. *H02M 3/155* (2013.01); *H02M 1/08* (2013.01)

(58) Field of Classification Search
CPC .............................. H02M 3/155; H02M 1/08
See application file for complete search history.

(56) References Cited

U.S. PATENT DOCUMENTS

| 6,724,174 | B1* | 4/2004 | Esteves | H02M 3/155 |
| | | | | 323/224 |
| 2008/0030178 | A1* | 2/2008 | Leonard | H02M 3/156 |
| | | | | 323/282 |
| 2010/0141225 | A1* | 6/2010 | Isham | H02M 3/156 |
| | | | | 323/282 |
| 2012/0126768 | A1* | 5/2012 | Ishino | H02M 3/156 |
| | | | | 323/283 |
| 2020/0091822 | A1* | 3/2020 | Ou | H02M 3/156 |
| 2020/0336065 | A1* | 10/2020 | Mei | H02M 3/158 |

\* cited by examiner

*Primary Examiner* — Kyle J Moody
(74) *Attorney, Agent, or Firm* — Mark Luo (57) ABSTRACT

This present invention is an invented high-performance error amplifier concept and unique circuitry architecture for controller of switching mode power supply (SMPS). The invented error amplifier comprises a front-end buffer circuit, an embedded differential amplifier, an N-MOSFET based output driving stage and coupled passive RC network. The embedded error amplifier is constructed with two differential pair inputs and an output amplification stage. N-MOSFET output stage coupled to the output of the embedded differential amplifier enhances the load driving capability of proposed error amplifier. The clamp voltage can be configured by another passive network and an output stage with two current sources. This invention allows user to arbitrarily configure the clamp voltage level regardless of the error amplifier's bias voltage. In addition, the highly accurate clamp voltage level can be achieved without temperature drift issue.

9 Claims, 9 Drawing Sheets

(Proposed Error Amplifier Circuit Architecture for VR Controller)

FIG. 4
(Proposed Error Amplifier Circuit Architecture for VR Controller)

FIG. 5
(Embedded Buffer Circuit Implementation)

FIG. 6
(Embedded Error Amplifier Implementation)

FIG. 7
(Bode Plot from FB to EAO)

FIG. 8
(Bode Plot from VREF to EAO)

ERROR AMPLIFIER WITH ACCURATE OUTPUT CLAMP FUNCTION

TECHNICAL FIELD

The present disclosure relates to an error amplifier (EA) circuit and applied switching mode power supply circuits, and more particularly on how to obtain accurate output clamp and thus improve accuracy and speed of a control loop for a voltage regulator.

BACKGROUND

A power electronics converter has been widely used in various electronic system. In all the converter designs, one key technique is how to accurately and timely regulate output voltage to various electronic loads such as CPU and memory chipsets. In any voltage converter control loop, an error amplifier (EA) lays a critical role for converter accuracy and dynamic performance. For example, a basic constant on-time control-based voltage regulator (VR) comprises MOSFETs, comparator and error amplifier. Control signal, pulse width modulation (PWM) signal of the main circuit, is generated by directly comparing feedback voltage, compensation ramp with the reference voltage. Thus, the converter output accuracy is highly dependent on ramp amplitude, rate and comparator's speed, where the comparator can be understood as a special error amplifier. The output voltage will be regulated within a certain range around the reference voltage instead of being exactly equal. Regulation compatibility and accuracy for a converter is limited without an accurate error amplifier in the control loop. An improved control scheme is to add an error amplifier to outer control loop to a more accurate output regulation. An example is referred to as a V2 control mode.

This disclosure presents a novel error amplifier with sufficient current (DC) gain and accurate voltage clamping capability. Exemplary implementation scheme of invented amplifier may be adopted for a converter control loop to improve output accuracy and dynamic performance. The details of one or more examples and techniques of this disclosure are set forth in the accompany drawings and the description below. Other features and advantages of the disclosure will be made apparent.

SUMMARY

In general, this disclosure describes an embodiment of an invented high-performance error amplifier concept for switching mode power supply (SMPS). Proposed error amplifier scheme comprises a buffer circuit, a special differential amplifier stage with two differential pair inputs, a passive network for the main pole, a passive network for the clamp voltage configuration, an output stage with two current sources, and one N-Channel MOSFET (N-MOSFET) that is coupled to the output of the differential amplifier to enhance its load driving capability. For the two pairs of inputs of the special differential amplifier stage, one pair of input is used to compare the reference voltage and the feedback signal while the other pair of input is used to accurately adjust the clamp voltage. A buffer stage is added to the reference voltage input pin to keep the input impedance for the reference input voltage pin as high impedance. This buffer also supplies the current needed by the passive network for the clamp voltage configuration. The error amplifier's main pole is determined by the feedback passive network. The output stage combined with the amplifier stage and the clamp voltage configuration passive network can achieve accurate output voltage clamping.

There are several extraordinary features for the proposed novel error amplifier solution. First, the upper and lower clamping voltage can be simply configured by two resistors and two current sources. The clamping voltage can be configured at any voltage within the bias voltage range. Second, the accuracy of the clamping voltage is significantly improved because the integrated resistors can be matched well, and current sources have very low tolerance and low temperature sensitivity inside the same, one die. Third, the error amplifier can achieve very high DC gain due to its two pairs of input terminals at the differential amplifier stage. Fourth, compared with the previous state-of-art voltage clamping solutions, the proposed solution combines the error amplifier function and the voltage clamping function in one integrated circuit without increasing the cost.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
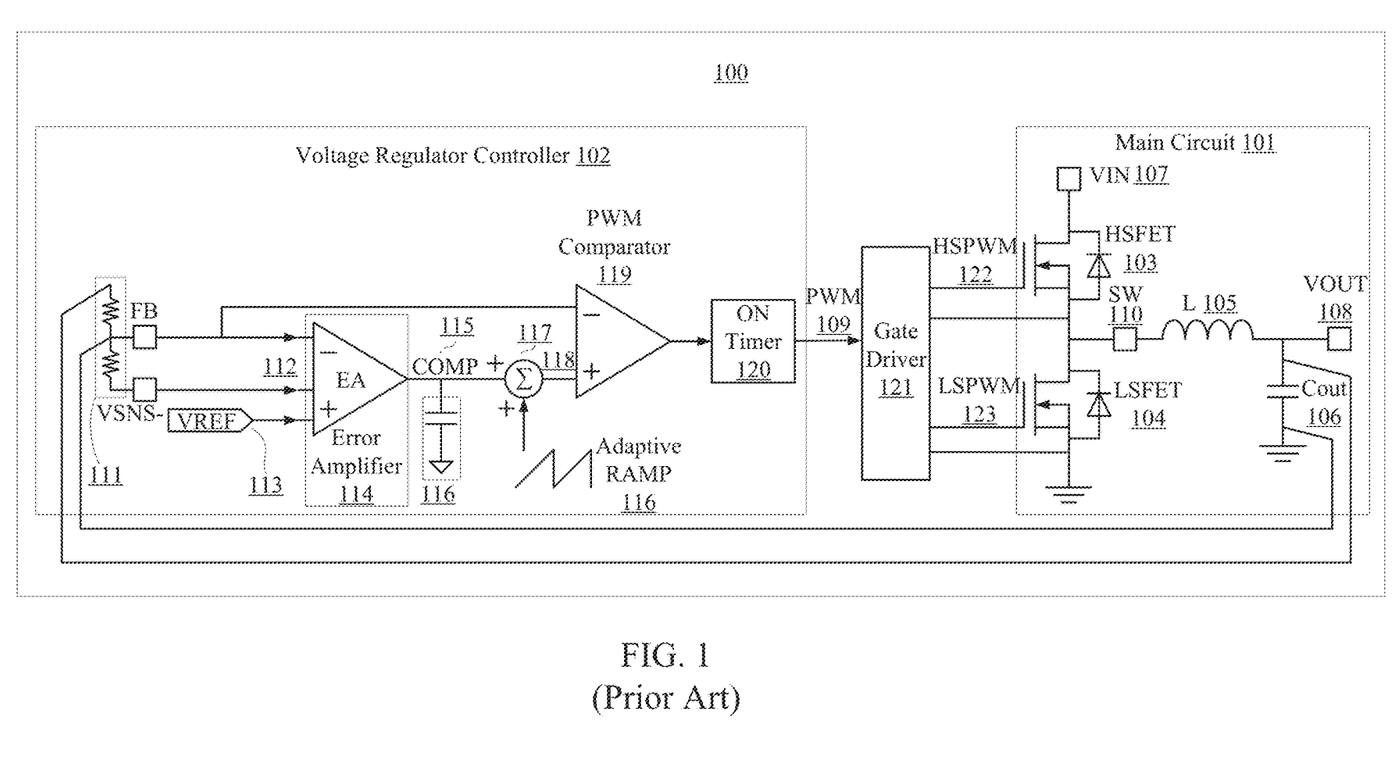
FIG. 1 is a block diagram illustrating a prior art VR converter system structure of using V2 constant on time control mode.

FIG. 1 illustrates a typical voltage regulator (VR) 100 system structure of using V2 constant on-time control mode. Generally, the VR converter system includes a main circuit (VR power circuit) 101, a gate driver 121 and a VR control circuit 102. The main circuit 101, including a pair of power MOSFETs (HSFET 103 and LSFET 104), an inductor 105 and an output capacitor 106, can draw power from its input terminal "Vin" 107 and produce a desired voltage level at its output terminal 108. The pair of the power MOSFETs 103 and 104 are connected in totem-pole structure. Driving by the PWM signal 109 generated from the VR control circuit 102, this totem-pole structure can generate PWM waveform at the switching node (SW) 110. The inductor 105 and the output capacitor 106 form a second-order filter to filter out the high frequency harmonics so that it can generate a low-noise DC voltage source at the node VOUT 108 to supply any external load. The VR control circuit 102 senses the output voltage at node VOUT 108 through a resistor voltage divider 111. Then, the sensed feedback voltage signal 112 is compared with a voltage reference voltage 113 through an error amplifier (EA) 114 to generate an output signal COMP 115 for the error amplifier. To improve the stability and dynamics response for an error-amplifier based compensator, a passive compensation network (a capacitor in this case for instance) 116 is usually added to the output terminal of the error amplifier. According to the operation of the V2 constant on-time control, the amplified error signal 115 needs to add an adaptive ramp signal 116 by an adder circuit 117 to generate the combined signal 118. This combined signal 118 is then compared with the originally sensed voltage signal 112 by a PWM comparator 119, and then pass through the on timer 120 to generate the PWM signal 109. At last, the PWM signal 109 is fed into a gate driver circuit 121 to generate two complementary PWM driving signals for the HSFET 122 and LSFET 123 respectively. The HS-PWM signal 122 has the same polarity as the original PWM signal 109 and the LS-PWM signal 123 is inverted to the original PWM signal 109. Thus, the output voltage can be regulated to a desired range by setting the reference voltage 113 and feedback voltage divider accordingly.

Figure 2:
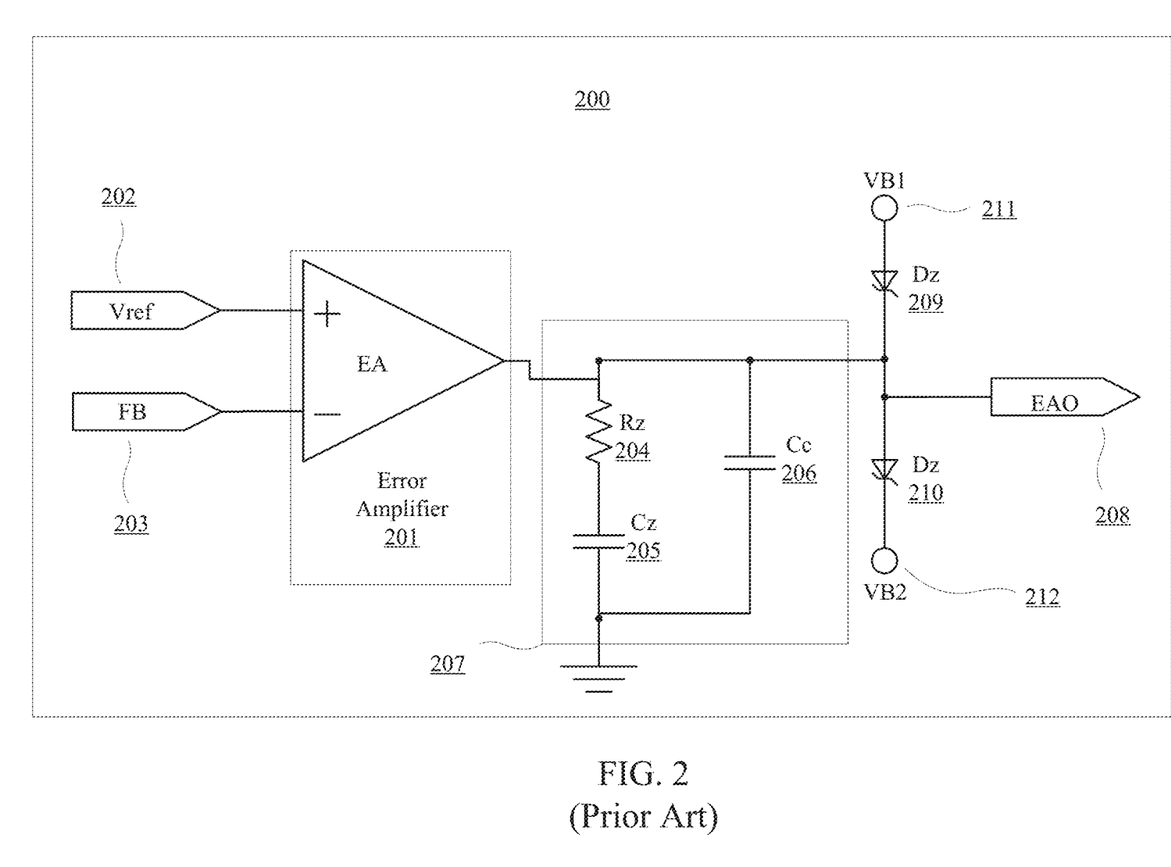
FIG. 2 illustrates a prior art of an error amplifier with Zener diodes to clamp output voltage of the amplifier.

To achieve better voltage regulation performance, such as low DC error, high bandwidth and faster response, the error amplifier (EA) needs high DC gain and high bandwidth, which makes the EA very sensitive to input signal changes and noises. Also, the high DC gain will sometimes cause the EA to saturate or cause over-modulation for the PWM comparator, which could trigger a fault or a shutdown event to the VR circuit. A typical solution to this issue is to add a clamp circuit at the output of the EA. Two conventional solutions are described as follows:

FIG. 2 illustrates a prior art of an error amplifier with Zener diode to clamp output voltage of the amplifier 200. The error amplifier (EA) 201 has two inputs, VREF 202 and FB 203. The three passive components Rz 204, Cz 205 and Cc 206 comprises a compensation network 207 connecting to the output terminal EAO 208 of the error amplifier 201. Also, two clamp zener diodes 209 and 210 are connected to the output terminal 208. The anode of the zener diode 209 is connected to the high clamp voltage node VB1 211 and the cathode of the zener diode 209 is connected to the output terminal 208. The anode of the zener diode 210 is connected to the output terminal 208 and the cathode of the zener diode 210 is connected to the low clamp voltage node VB2 212. According to the principle of the zener diode, the high voltage end at the output terminal 208 is clamped at Vclamp_H=VB1+VBv, and the low end voltage at the output terminal 208 is clamped at Vclamp_L=VB2−VBv, where VBv is the reverse breakdown voltage of Zener diode Dz. However, there are two major disadvantages for this solution. First, for the VR controller application, the voltage at the output terminal 208 is small (typically less than 5V), which means the VBv for the zener diode is also selected near this range. According to the industry and manufacturer's data, the low voltage zener has a wider parameter distribution. Thus, the precision of the clamp voltage is significantly compromised. Second, the VBv for zener diode is very sensitive to temperature. Usually, the VR circuit operates at temperature ranges from 30° C. to as high as 85° C. As a result, VBv will drift significantly due to temperature change, and in turn, cause low precision to the clamp voltage.

Figure 3:
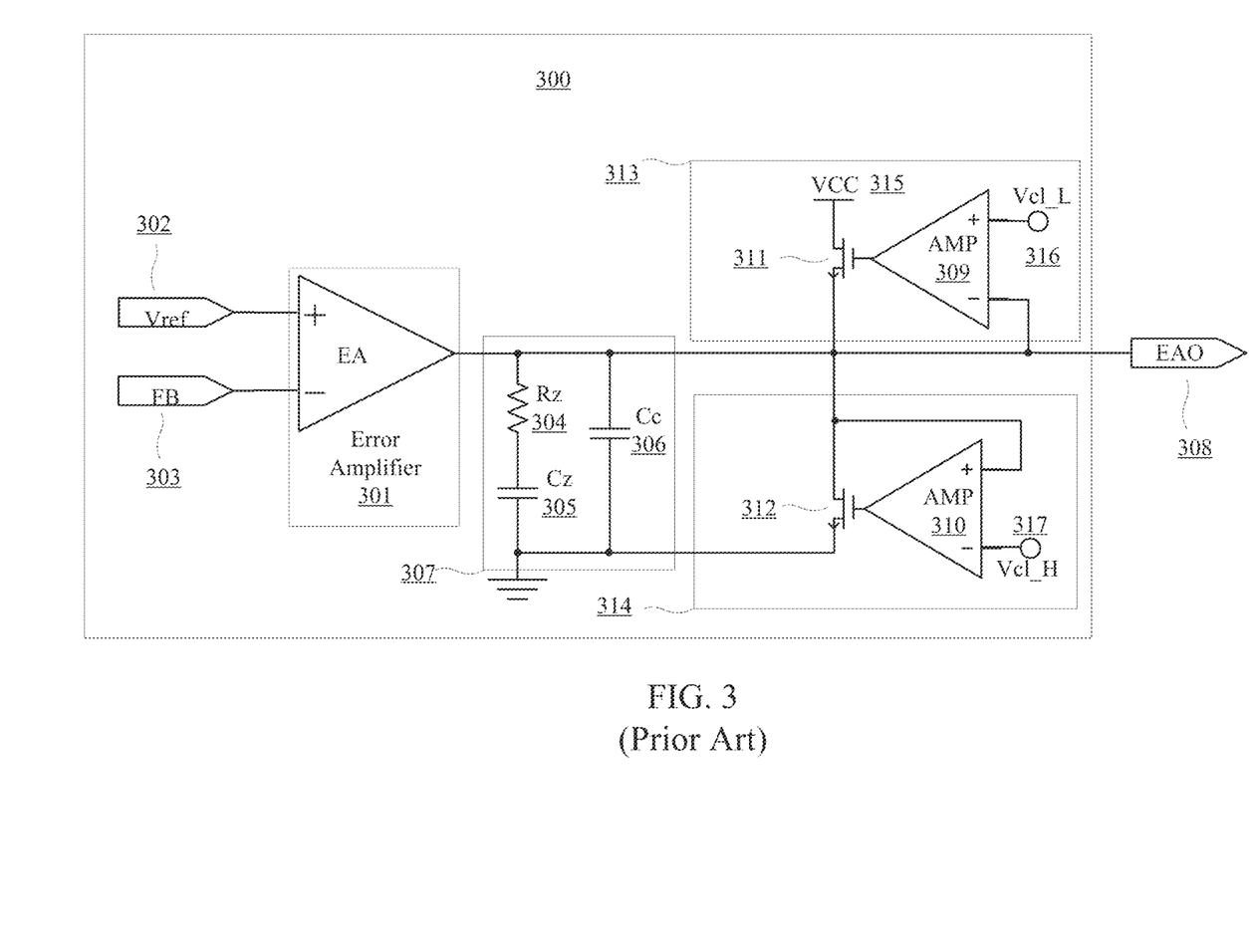
FIG. 3 illustrates a prior art of an error amplifier with voltage buffer to clamp output voltage of the amplifier.

FIG. 3 illustrates a prior art of an error amplifier with voltage buffer to clamp output voltage of the amplifier 300. Same as the previous solution 200, the error amplifier (EA) 301 has two inputs, VREF 302 and FB 303. The three passive components Rz 304, Cz 305 and Cc 306 comprises a compensation network 307 connected to the output terminal 308 of the error amplifier 301. Different from the previous solution 200, the voltage clamp circuit is implemented by operational amplifier (op-amp) 309 310 and JFET 311 312. For the low-end voltage clamp circuit 313, the JFET's drain is connected to the bias node VCC 315, the source is connected to the output terminal 308 and the gate is connected to the output of an op-amp 309. The low-end clamp voltage reference Vcl_L 316 is connected to the positive input of the op-amp 309 and the output terminal 308 is connected to the negative input of the op-amp 309 to form a feedback loop. Thus, when the voltage on the output terminal 308 is lower than the low-end clamp voltage reference Vcl_L 316, the op-amp 309 will output high and turn on the JFET 311. The bias voltage VCC 315 will inject current through the JFET 311 to charge up the output terminal 308 until the voltage at the output terminal node 308 surpasses the Vcl_L. The same mechanism is also applied to the high-end clamp voltage circuit 314 formed by the JFET 312 coupled to ground, the op-amp 310 and the high-end clamp voltage reference Vcl_H 317. The advantage of this solution is that it eliminates the clamp voltage precision drift caused by components' parameter distribution and temperature change. However, the disadvantage is of significant increase in cost and circuit complexity. Also, adding two more op-amps to the circuit will affect the dynamic response of the error amplifier 301.

For both solutions mentioned in FIG. 2 and FIG. 3, the slew rate of output voltage is limited due to the existence of capacitor Cc, and the output can't be quickly tracked by the change in VR output or reference Vref at input terminals of the error amplifier. Therefore, these solutions may not be suitable for applications where the Vref or output voltage may change in a high slew rate, such as application in CPU or chipset with fast voltage ID and dynamic loading.

Figure 4:
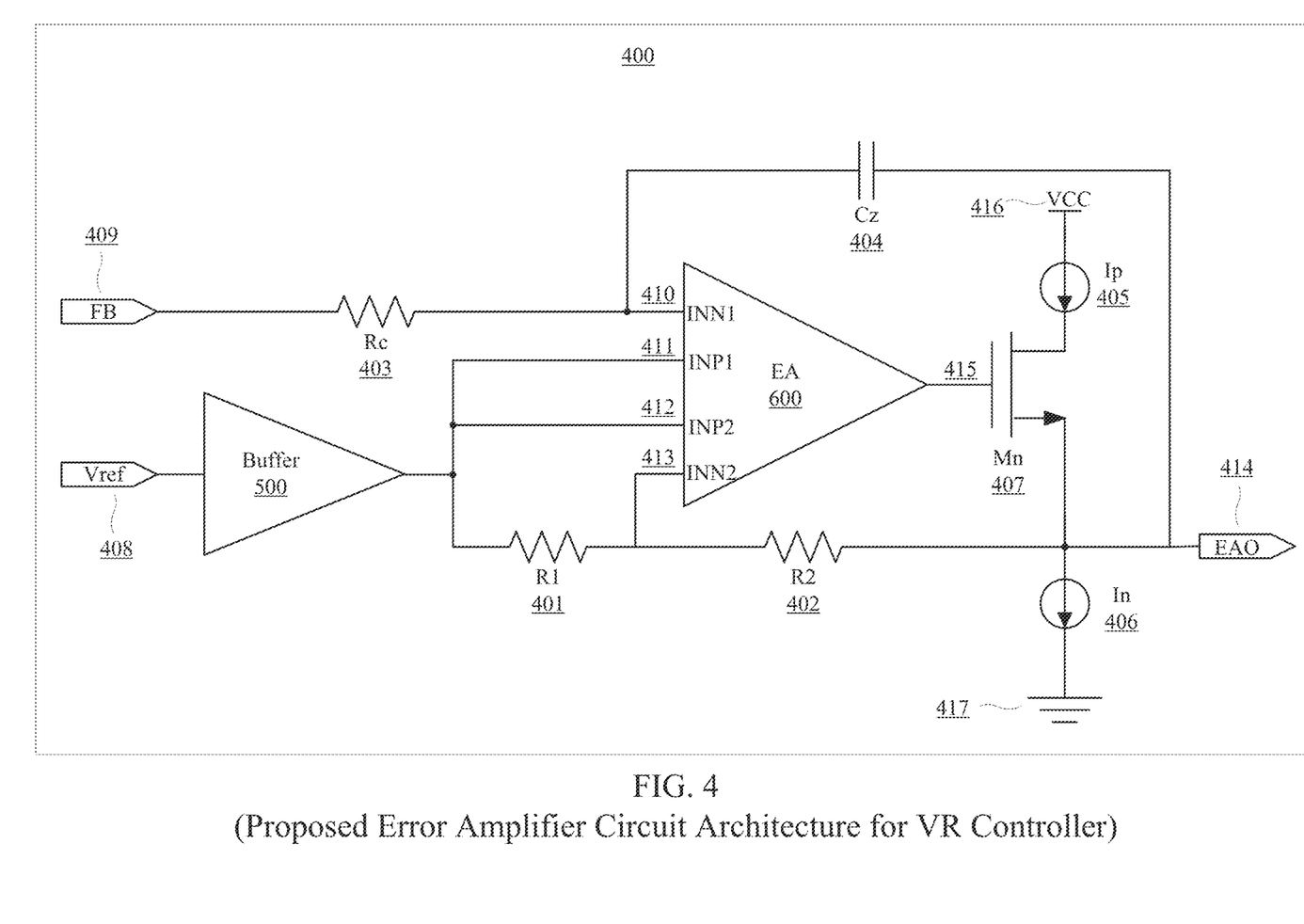
FIG. 4 illustrates basic circuit architecture of proposed error amplifier, in accordance with one or more techniques described in this disclosure.

FIG. 4 illustrates the basic circuit architecture of the proposed error amplifier 400, which includes a buffer 500, a specially structured error amplifier with two pairs of input terminals 600, a feedback network comprising 401 and 402, which determines the high-end clamp voltage and the low-end clamp voltage, a feedback network consisting of 403 and 404 determines the main pole. The output driving stage of the error amplifier comprises a current source Ip 405, another current source In 406 and a N-MOSFET Mn 407. The buffer 500 supplies the current to the feedback network formed by R1 401 and R2 402 while maintaining high impedance status for the input pin VREF 408. The output of the buffer is also coupled to the input terminal INP1 411 and the terminal INP2 412 of the error amplifier. Thus, the voltage on these two terminals equals to the reference voltage applied on the VREF pin 408. The R1 401 is connected between the output of the buffer 500 and the inverting terminal INN2 413 of the EA. The R2 402 is connected between the output terminal EAO 414 and the inverting terminal INN2 413 of the EA. The feedback terminal Fb 409 is connected to the inverting terminal INN1 410 through a resistor Rc 403. The output terminal EAO 414 is connected to the inverting terminal INN1 413 pin through a capacitor 404. The output of the EA 415 drives a N-MOS- FET Mn 407. A current source Ip 405 is connected between the bias voltage VCC 416 and the drain terminal of Mn 407 and the direction of the current source is from VCC to drain of Mn. Another current source In 406 is connected between the source of Mn 407 to the ground node 417, and the direction is from source of Mn to the ground.

Further, operation theory of functional diagram in FIG. 4 is described as follows: Let's define the input voltage difference, $\Delta$Vi, equals to the voltage at terminal VREF 402 minus the voltage at feedback terminal FB 409. When $\Delta$Vi is small, the error amplifier 600 operates in the linear region, and the N-MOSFET Mn 407 also operates in the linear region, which is acting as a voltage follower between its source terminal and gate terminal. The output voltage of the error amplifier at node EAO 414 processes the input error signal $\Delta$Vi between the terminal FB 409 and the terminal VREF 408, and thus, the whole circuit 400 acts as an error amplifier. When $\Delta$Vi is positive and |$\Delta$Vi| is large enough, the EA 600 will enter the positive saturation region, so that Mn 407 also enters the saturation region. Thus, Mn 407 is fully turned on and the voltage at the EAO output terminal 414 is VREF+(Ip−In)*(R1+R2), which is the high-end clamp voltage. When $\Delta$Vi is negative and |$\Delta$Vi| is large enough, the EA 600 will enter the negative saturation region, so that Mn 407 is completely turned off. Thus, the voltage at the EAO terminal 414 is VREF−In*(R1+R2), which is the low-end clamp voltage. The high-end clamp voltage and the low-end clamp voltage can be easily configured by adjusting the resistance value of R1 401 and R2 402. Meanwhile, the precision of the clamp voltage is determined by the precision of the resistance values of R1 401 and R2 402, and the current source Ip 405 and In 406. High precision resistors with very small temperature drift may be achieved easily by modern integrated circuit technology. In addition, the current source with temperature compensation has been mature solutions. Compared with previous solutions, the proposed solution has the following advantages: first, this solution allows user to arbitrarily configure the clamp voltage level regardless of the error amplifier's bias voltage; second, the clamp voltage level can achieve high accuracy without temperature drift issue; and third, the cost-benefit is better than that of prior solutions.

Figure 5:
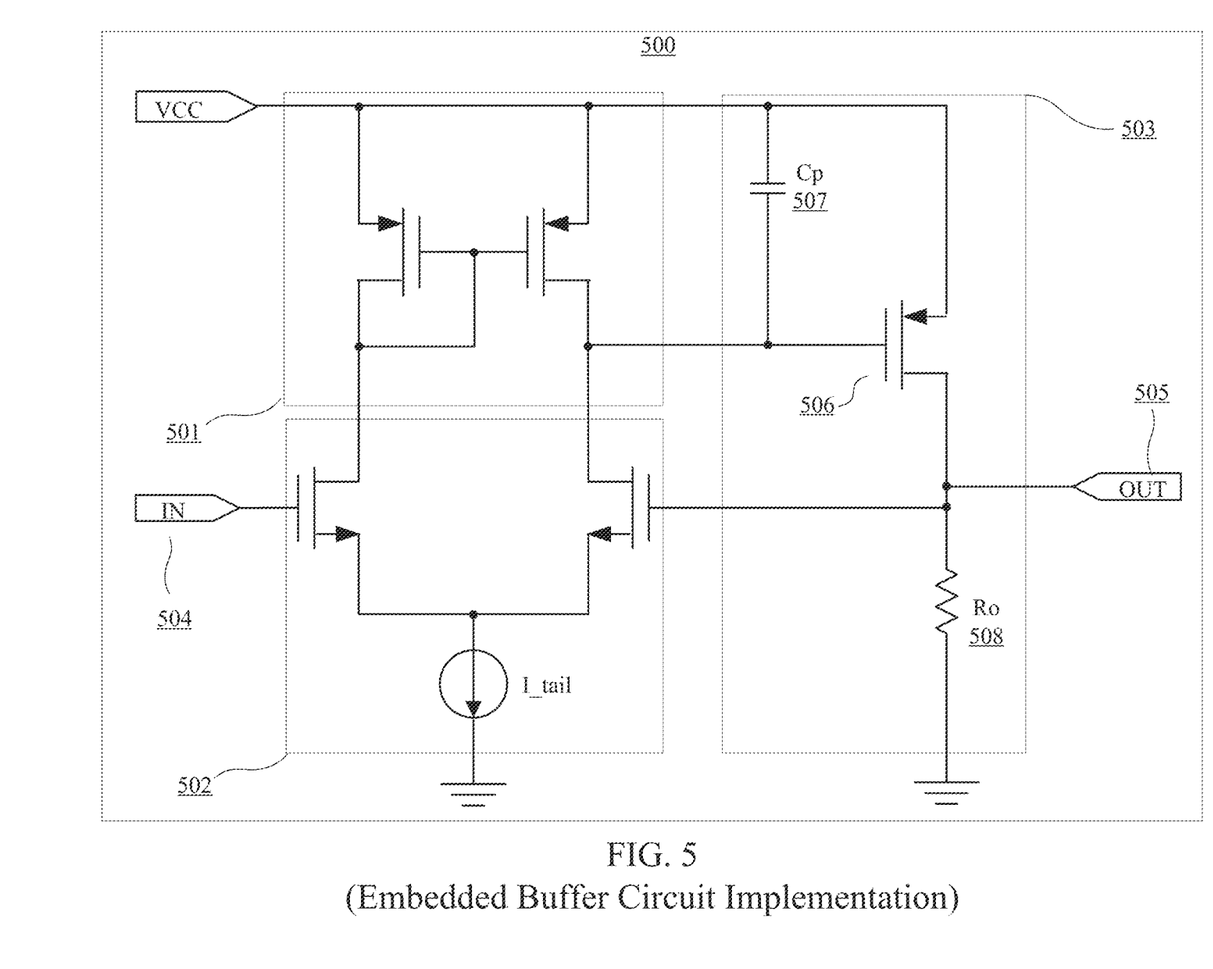
FIG. 5 illustrates a circuit-level embodiment implementation of an embedded buffer module to be used as a front part of proposed error amplifier, in accordance with one or more schemes described in this disclosure.

FIG. 5 illustrates a circuit-level embodiment implementation of an embedded buffer module to be used as a front part of proposed error amplifier 600. The buffer 500 comprises a current mirror circuit 501, a differential pair 502 and an output stage 503. First, two P-MOSFETs are used to form a current mirror circuit 501. Second, two N-MOSFETs and a bias current source form a differential pair. The current mirror and the differential pair form a differential amplifier 502, which can keep the voltage at the input terminal 504 and the output terminal 505 always the same. Third, a P-MOSFET 506 is added to the output stage 503 to enhance the current drive capability. A capacitor 507 is connected between the gate and the source terminal of the P-MOSFET 506 to stabilize the output. A pull-down resistor 508 is also added to the output stage 503 to determine the output voltage scaling.

Figure 6:
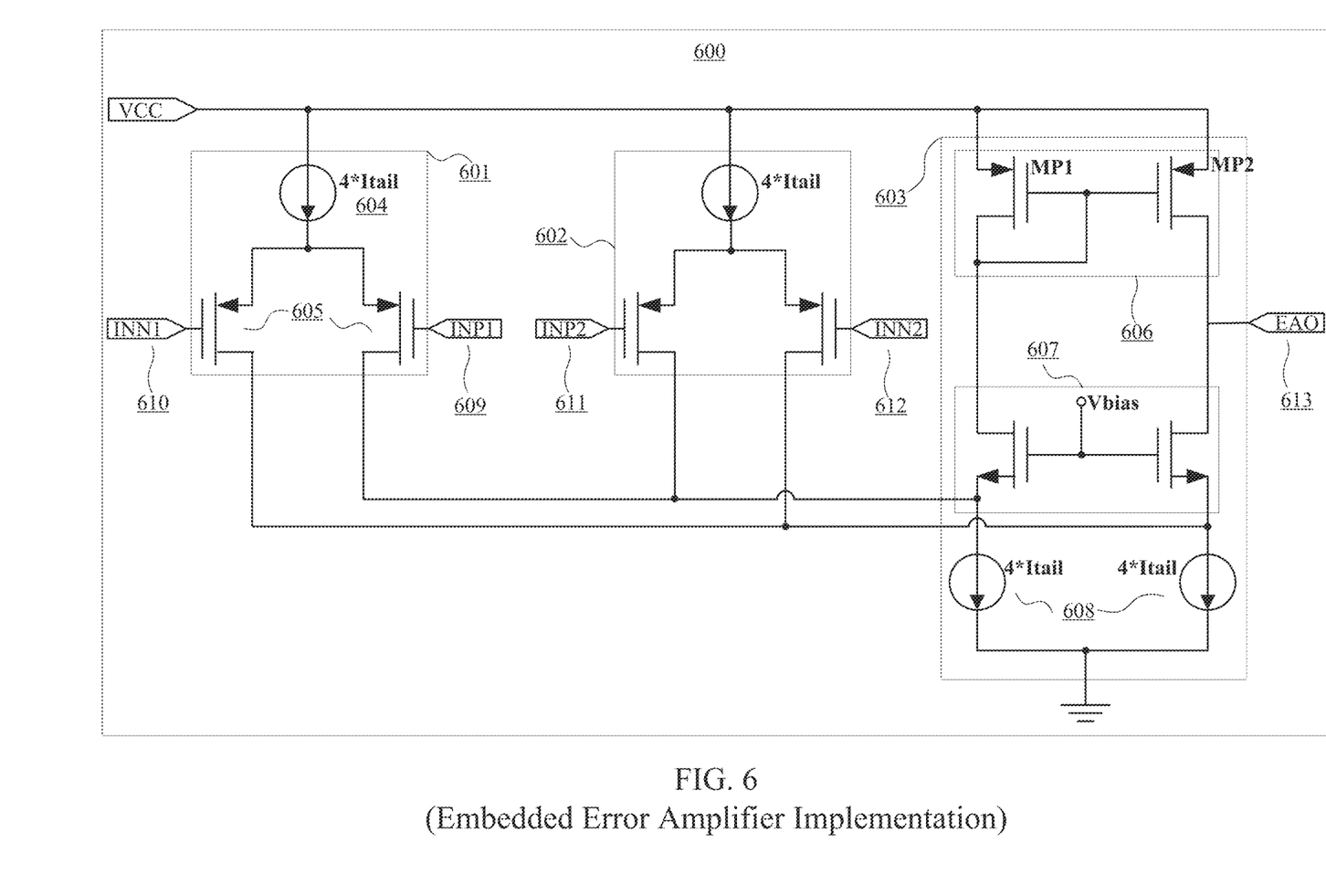
FIG. 6 illustrates a circuit-level embodiment implementation for the embedded error amplifier to be used as core circuitry for the proposed error amplifier, in accordance with one or more schemes described in this disclosure.

FIG. 6 illustrates a circuit-level embodiment implementation for the embedded error amplifier to be used as core circuitry for the proposed error amplifier 600. The error amplifier consists of two differential pairs (601 and 602 for the first and second pair, respectively) and an output amplification stage 603. Each differential pair includes a bias current source 604 and two P-MOSFETs 605. The positive outputs of the two differential pair are connected, as well as the negative outputs. The output amplifier stage 603 includes a current mirror circuit 606, a pair of common base N-MOSFET 607 and two bias current sources 608. Let the voltage difference between the terminal INP1 609 and the terminal INN1 610 equals to $\Delta$V1 and the voltage difference between the terminal INP2 611 and the terminal INN2 612 equals to $\Delta$V2. Assuming the whole error amplifier 600 has a gain of G, then the output voltage at the output terminal EAO 613 equals to G($\Delta$V1+$\Delta$V2).

An exemplary simulation is completed.

Figure 7:
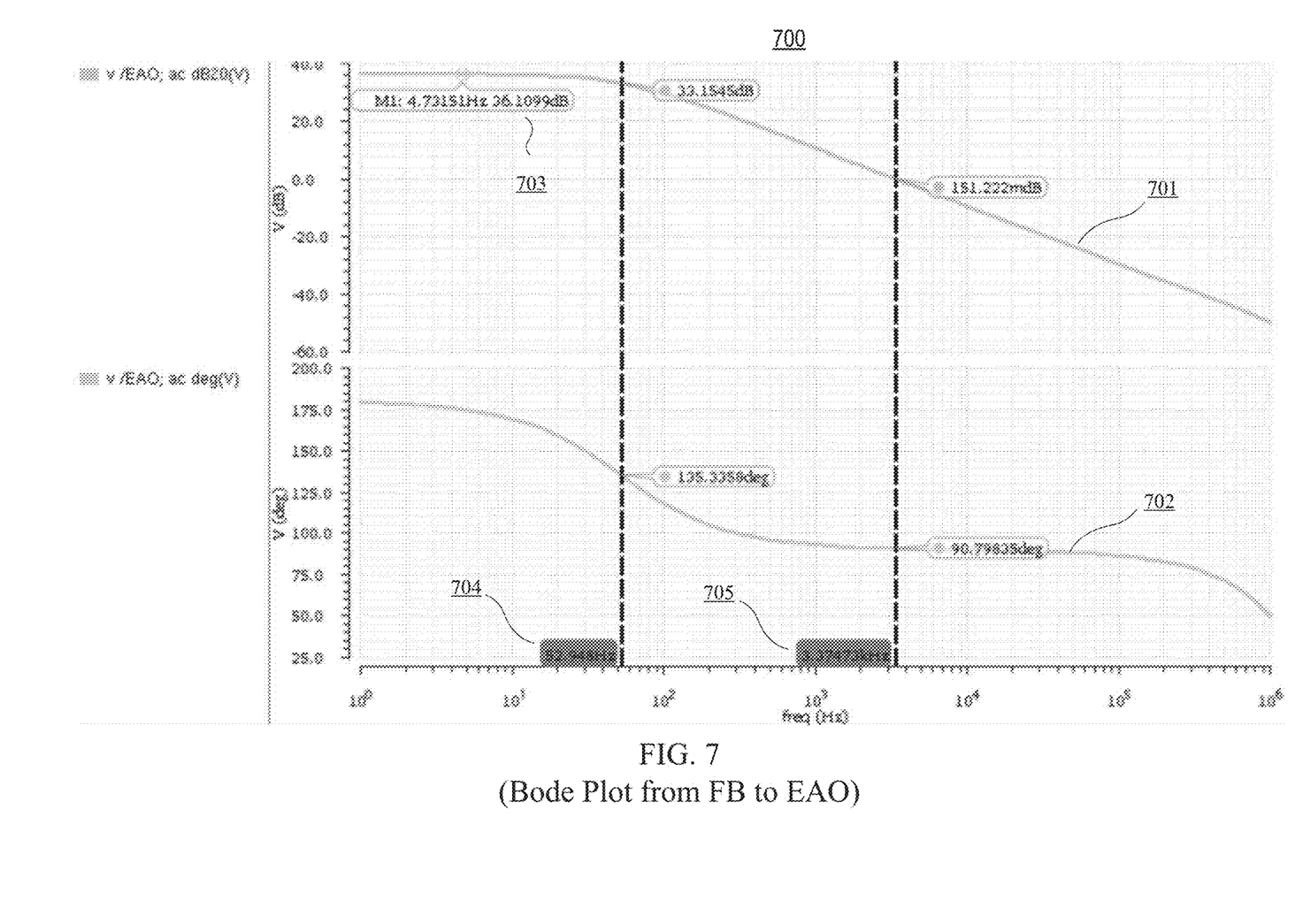
FIG. 7 shows a simulated bode plot from feedback signal FB to the output EAO of error amplifier. It also shows that the calculated DC gain and the main pole match the simulation result.

Set up: Rc=5Meg, Cc=10p, R1=R/8, R2=8*R, R=1.6k, Ip=2uA, In=1uA, VREF=600 mV;

As mentioned above: Av_20 dB=20*log(R2/R1)=20*log64=36.1 dB;
Pole=1/(2*n*Rc*Cc*Av)=1/(2*e5Meg*10p*64)=49.7 Hz;
Vclamp_H=(Ip−In)*(R1+R2)+VREF=(2 uA−1 uA)*(200+12.8 k)+600 mV=613 mV;
Vclamp_L=VREF −(In*(R1+R2))=600 mV−1 uA*(200+12.8 k)=587 mV;

FIG. 7 shows a simulated bode plot 700 from feedback signal FB to the output of error amplifier EAO. The gain response is the curve 701 and the phase response is the curve 702. As it is shown, the estimated DC gain marked on the figure is 36.1099 dB 703, which agrees well with the calculated result Av_20 dB=36.1 dB. The main pole marked on the figure is located at 52.948 Hz 704, which is well aligned with the calculated result Pole=49.7 Hz. The crossover frequency is at 3.37473 kHz 705 and as it is shown, the phase angle maintains around −90 degree for a wide frequency range 702.

Figure 8:
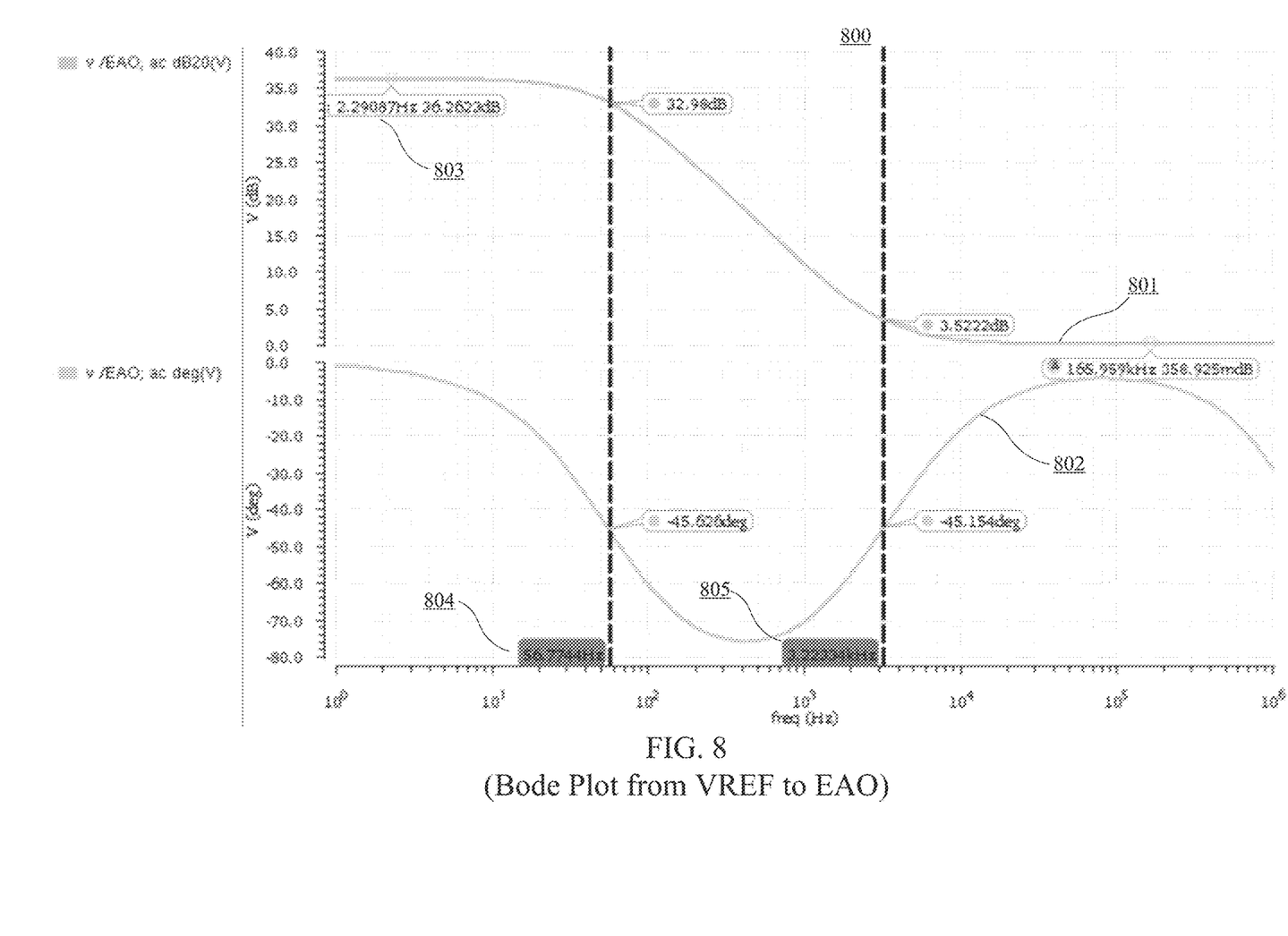
FIG. 8 shows a simulated bode plot from reference voltage VREF to the output EAO of error amplifier.

FIG. 8 shows a simulated bode plot 800 from reference voltage VREF to the output of error amplifier EAO. The gain response is the curve 801 and the phase response is the curve 802. Simulated results illustrate changes of EAO as Vref. As shown, the estimated DC gain marked on the figure is 36.2623 dB 803, which agrees well with the calculated result Av_20 dB=36.2 dB. The main pole marked on the figure is located at 57.7744 Hz 804, which is well aligned with the calculated result Pole=57.7 Hz. The crossover frequency is at 3.2233 kHz 805 and as it is shown, the phase angle maintains around −90 degree for a wide frequency range 802.

Figure 9:
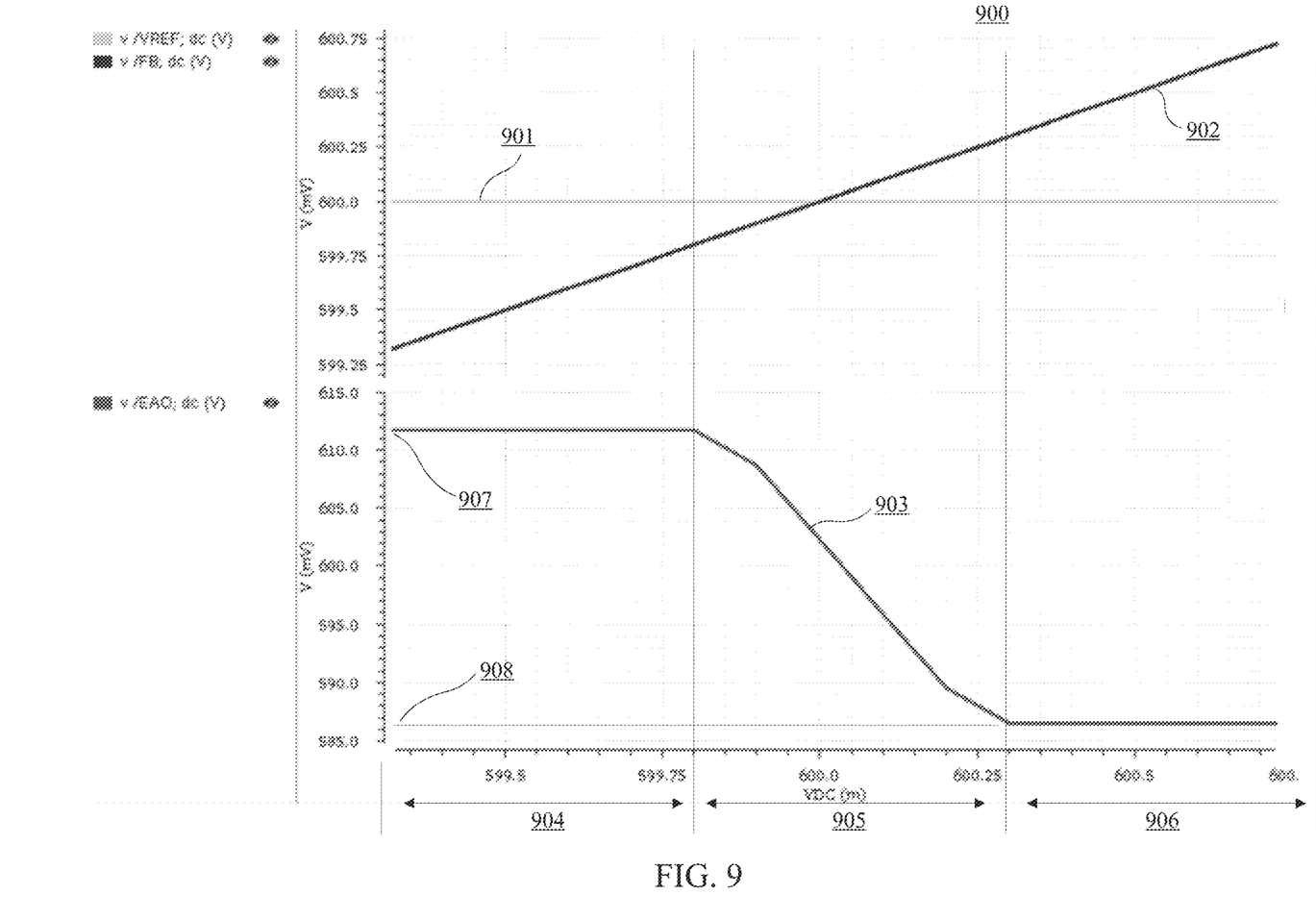
FIG. 9 shows error amplifier output (EAO) response to the difference value between VREF and VFB. It also shows that the upper and lower clamping voltage matches the calculation result.

FIG. 9 shows change of EAO along with the difference value between VREF and VFB 900. In this simulation, the VREF voltage is set to 600 mV 901 and the FB voltage ramp up from 599.3V to 600.7V 902. The output voltage EAO is the curve 903. During the first stage 904, the voltage difference between VREF and FB is large, so the output voltage is limited at the high-end clamp voltage 613 mV 907. During the second stage 905, the voltage difference between VREF and FB is small, so the EA operates at linear region and the output voltage drops almost linearly as the FB voltage ramps up. During the third stage 906, the voltage difference between VREF and FB is large again, so the output voltage is limited at the low-end clamp voltage 587 mV 908.

Those skilled in same field will also appreciate that various adoption and modifications of alternative embodiments described above can be configured in same or similar concept and spirit of the disclosure. Therefore, it is to be understood that, within the scope of the claims, the disclosure may be practiced other than as specifically described herein. For example, some schemes may be implemented using different semiconductor process or packaging techniques.

The exemplary embodiments were chosen and described in order to better explain the principles of the invention and the most possible practical application, and to help peers with ordinary skill in the art to understand the disclosure for various embodiments with possible modifications. Various changes in an actual implementation may be made although above exemplary embodiments have been used. In addition, many modifications may be made to adapt a specific application or to a particular system, to the teachings of the disclosure without departing from the essential scope thereof. Therefore, the disclosure not be limited to the exemplary embodiments disclosed for implementing this disclosure. Moreover, all of derived or evolved embodiments be covered within the scope of the appended claims. In addition, the reference, definition, and terminology used herein are for the purpose of describing specific embodiments only and are not intended to be limiting of the disclosure.

What is claimed is:

1. A voltage regulator system, comprising:
   a main circuit to draw power from its input terminal (Vin) to produce a desired output voltage following commands from a control circuit, wherein the main circuit is coupled to a gate driver of a VR controller and provides power to a load;
   a control circuit to provide a pulse width modulation (PWM) signal and MOSFET driving for the main circuit, wherein the control circuit further comprises:
      an output feedback voltage divider;
      a first error amplifier coupled to the output feedback branch of the output feedback voltage divider, wherein the first error amplifier further comprises:
         a front-end buffer circuit;
         a second error amplifier that is embedded within the first error amplifier;
         a first feedback network that determines the high-end clamp voltage and the low-end clamp voltage;
         a second feedback network that determines the main pole; and
         an N-MOSFET based output driving stage in which the output terminal of the N-MOSFET is connected to two current sources: a RC feedback compensation network and a resistor feedback voltage divider network, and wherein the gate of the N-MOSFET is connected to the output of the second error amplifier that is embedded within the first error amplifier;
      a fast PWM comparator to receive the first error amplifier output and an artificial ramp signal to compare with a direct feedback signal to generate the PWM signal;
      an ON timer coupled to the fast PWM comparator output to determine a PWM signal sequence and width; and
   a gate driver coupled between the main circuit and the control circuit to complete a feedback process.

2. The voltage regulator system of claim 1, wherein the front-end buffer circuit of the first error amplifier further comprises:
   a current mirror circuit formed by two P-MOSFETs: a first P-MOSFET and a second P-MOSFET;
   a differential pair formed by two N-MOSFETs: a first N-MOSFET and a second N-MOSFET, and a bias current source, wherein the first N-MOSFET's gate is connected to the IN terminal of the front-end buffer circuit, and the drain of the first N-MOSFET is connected to the drain of the first P-MOSFET of the current mirror circuit, and the gate of the second N-MOSFET is connected to the OUT terminal of the front-end buffer circuit and the drain of the second N-MOSFET is connected to the drain of the second P-MOSFET of the current mirror circuit;
   an output stage based on a third P-MOSFET to increase output driving capability, wherein the gate of the third P MOSFET is connected to the drain of the second N-MOSFET of the current mirror circuit, and the source of the third P-MOSFET is connected to the VCC terminal of the front-end buffer circuit, and the drain of the third P-MOSFET is connected to the output terminal of the front-end buffer circuit;
   a capacitor that is connected between the gate and the source terminal of the third P-MOSFET of the output stage to stabilize the output of the first error amplifier; and
   a pull-down resistor that is connected to the drain terminal of the third P-MOSFET of the output stage as the output terminal to determine output voltage scaling.

3. The voltage regulator system of claim 1, wherein the second error amplifier that is embedded in the first error amplifier further comprises:
   one or more differential pairs, which further comprises of two P-MOSFETs per each differential pair;
   a current mirror circuit formed by two P-MOSFETs;
   an output amplification stage that is formed by a pair of common base N-MOSFETs; and
   two current sources of the second error amplifier that is embedded within the first error amplifier that are connected to the output amplification stage of the second error amplifier that is embedded in the first error amplifier;
   a supply and a ground connected to the differential pairs, the current mirror circuit, and the output amplification stage of the second error amplifier that is embedded in the first error amplifier.

4. The voltage regulator system of claim 3, wherein the one or more differential pairs of the second error amplifier that is embedded in the first error amplifier comprises of two differential pairs and such two differential pairs further comprises:
   four input terminals; a set of first inverting input terminal and first noninverting input terminal, and a set of second inverting input terminal and second noninverting input terminal;
   two reference current sources: a first reference current source and a second reference current source, wherein each current source draws a current from the bias terminal of the mirror circuit of the second error amplifier that is embedded in the first error amplifier;
   a first differential pair based on a pair of P-MOSFETs: a first P-MOSFET and second P-MOSFET, wherein both the source terminals of both P-MOSFETs of the first differential pair are connected to the first reference current source, and the gate of the first P-MOSFET of the first differential pair is connected to the first inverting input terminal and the gate of the second P-MOSFET of the first differential pair is connected to the first noninverting input terminal;
   a second differential pair based on a pair of P-MOSFETs: a first P-MOSFET and a second P-MOSFET, wherein the source terminals of both P-MOSFETS of the second differential pair are connected to the second reference current source, and the gate of the first P-MOSFET in the second differential pair is connected to the second noninverting input terminal and the gate of the second P-MOSFET of the second differential pair is connected to the second inverting input terminal.

5. The voltage regulator system of claim 3, wherein the two P-MOSFETs in the current mirror circuit of the second error amplifier that is embedded within the first error amplifier further comprises:
   a first P-MOSFET and second P-MOSFET, wherein the sources of both of the two P-MOSFETs are connected to the supply of the second error amplifier that is embedded within the first error amplifier, and the gates of both of the two P-MOSFETs are connected together and also to the drain of the first P-MOSFET, and the drain of the second P-MOSFET is connected to the output terminal of the second error amplifier that is embedded within the first error amplifier.

6. The voltage regulator system of claim 3, wherein the two N-MOSFETs of the output amplification stage of the second error amplifier that is embedded within the first error amplifier further comprises:
   a first N-MOSFET and a second N-MOSFET, wherein the gates of both of the two N-MOSFETs are tied together to an inside bias, and the drain of the first N-MOSFET is connected to the drain of the first P-MOSFET's drain in the current mirror circuit of the second error amplifier that is embedded within the first error amplifier and the drain of the second N-MOSFET is connected to the drain of the second P-MOSFET in the current mirror circuit of the second error amplifier that is embedded within the first error amplifier, and the source of the first N-MOSFET is connected to each of the drain of the P-MOSFETs that make up the differential pairs of the second error amplifier that is embedded within the first error amplifier and the source of the second N-MOSFET is connected to each of the drain of the P-MOSFETs that make up the differential pairs of the second error amplifier that is embedded within the first error amplifier.

7. The voltage regulator system of claim 1, wherein the first feedback network of the first error amplifier further comprises:
   a resistor that is connected to both the feedback terminal and the first inverting input terminal of the first differential pair of the second error amplifier that is embedded within the first amplifier; and
   a capacitor that is connected to both the first inverting input terminal of the first differential pair of the second error amplifier that is embedded within the first error amplifier and the output terminal of the second error amplifier that is embedded within the first error amplifier.

8. The voltage regulator system of claim 1, wherein the second feedback network of the first error amplifier further comprises:
   a first resistor that connects the output of the front-end buffer circuit with the second inverting input terminal of the four input terminals of the second error amplifier that is embedded within the first error amplifier; and
   a second resistor that connects the second inverting input terminal of the four input terminals of the second error amplifier that is embedded within the first error amplifier with the output of the second error amplifier that is embedded within the first amplifier.

9. The voltage regulator system of claim 1, wherein the first error amplifier further comprises an output amplification stage, wherein the output amplification stage of the first error amplifier further comprises:
   an N-MOSFET, wherein the gate of the N-MOSFET is connected to the output terminal of the second error amplifier that is embedded within the first error amplifier and the first and second feedback networks of the first error amplifier, and the drain of the N-MOSFET is connected to a current source, wherein the source terminal of the current source is connected to one current source;
   a first current source coupled to the supply of the second error amplifier that is embedded within the first error amplifier to supply current bias to the drain of the N-MOSFET of the output amplification stage of the first error amplifier; and
   a second current source connected to ground, wherein the terminal of the second current source connects the second resistor of the second feedback network of the first error amplifier with the output of the second error amplifier that is embedded within the first error amplifier.

* * * * *